(12) United States Patent
Kwon et al.

(10) Patent No.: US 7,216,017 B2
(45) Date of Patent: May 8, 2007

(54) CENTRAL CONTROL SYSTEM FOR AIRCONDITIONER AND METHOD FOR OPERATING THE SAME

(75) Inventors: Jae Hwan Kwon, Seoul (KR); Sang Chul Youn, Kyungki-do (KR); Duck Gu Jeon, Seoul (KR); Jae Sik Jung, Seoul (KR); Young Soo Yoon, Seoul (KR); Jun Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/896,845

(22) Filed: Jul. 23, 2004

(65) Prior Publication Data

US 2005/0209738 A1   Sep. 22, 2005

(30) Foreign Application Priority Data

Mar. 22, 2004   (KR) ............... 10-2004-0019429

(51) Int. Cl.
*G06F 19/00* (2006.01)
(52) U.S. Cl. ............... 700/276; 700/275; 700/277; 379/102.05
(58) Field of Classification Search ............... 700/275, 700/276, 277; 379/102.05
See application file for complete search history.

(56) References Cited

U.S. PATENT DOCUMENTS 6,038,486 A * 3/2000 Saitoh et al. ............... 700/96
6,385,510 B1 * 5/2002 Hoog et al. ............... 700/276
6,414,523 B1 * 7/2002 Yoshizaki ............... 327/112
6,640,141 B2 * 10/2003 Bennett ............... 700/19
6,726,111 B2 * 4/2004 Weimer et al. ............... 236/51
6,741,915 B2 * 5/2004 Poth ............... 700/276
6,865,898 B2 * 3/2005 Yamanashi et al. ............... 62/132
2002/0029096 A1 * 3/2002 Takai et al. ............... 700/276
2003/0097204 A1 * 5/2003 Coogan ............... 700/276

FOREIGN PATENT DOCUMENTS

JP   2003-090584   3/2003
KR   2005-55905   6/2005

OTHER PUBLICATIONS

English Language abstract of JP 2003-090584.
English Language abstract of Korean 2005-55905.

* cited by examiner

*Primary Examiner*—Michael D. Masinick
(74) *Attorney, Agent, or Firm*—Greenblum & Bernstein, P.L.C.

(57) ABSTRACT

A central control system for airconditioner(s) and a method for controlling the same. The central control system can centrally control a plurality of airconditioners connected to the same communication network. In the system, a protocol converter connected to a central controller converts a communication standard of a signal communicated between the airconditioners and the central controller into another communication standard, acquires connection state information by scanning connection state information of individual airconditioners, and transmits the acquired information to the central controller, such that a manager can correctly monitor an airconditioner state using the central controller, resulting in the implementation of a reliable control system.

12 Claims, 4 Drawing Sheets

CENTRAL CONTROL SYSTEM FOR AIRCONDITIONER AND METHOD FOR OPERATING THE SAME

BACKGROUND OF THE INVENTION

1. Field of the Invention

The present invention relates to an air-conditioning system for connecting a protocol converter to a central controller capable of centrally controlling one or more airconditioners interconnected over a communication network, and more particularly to an air-conditioning system for controlling a protocol converter to communicate with an airconditioner using a first communication standard, and controlling the protocol converter to communicate with a central controller using a second communication standard, such that mutual signal communication is made available using a protocol conversion process.

The protocol converter of the present invention scans, in real time, connection states of a plurality of airconditioners, and transmits the scanned result to the central controller, such that the central controller can automatically recognize airconditioners currently connected to the communication network, resulting in implementation of more correct integrated-control operations.

2. Description of the Related Art

With the increasing demands of users who desire to use airconditioners at any location, there has recently been developed a system for controlling a plurality of indoor units installed at many places, for example, individual rooms of a house and individual offices of a building, etc.

The indoor units are classified into a single-type airconditioning system and a multi-airconditioning system according to a connection method between the indoor units and an outdoor unit.

The single-type airconditioning system includes indoor units installed in individual rooms, and outdoor units connected to the indoor units on one to one basis. The multi-airconditioning system includes a plurality of indoor units installed in individual rooms and a small number of outdoor units less than the indoor units. One outdoor unit is shared with a predetermined number of indoor units. It should be noted that the single-type airconditioning system and the multi-airconditioning system will hereinafter be generally called an airconditioning system for the convenience of description.

A user of the aforementioned airconditioning system enters a control command in the airconditioning system using a key entry unit installed in an indoor unit, a microprocessor contained in the indoor unit connected to the key entry unit generates a control signal in response to the control command to control operations of the airconditioning system, resuling in indoor cooling implementation.

Needless to say, if the outdoor unit adapted for the airconditioning system is configured in the form of a heat pump capable of switching the direction of refrigerant circulation, an indoor heating function can also be made available.

If unexpected erroneous operations occur in either the indoor unit or the outdoor unit contained in the airconditioning system, a system administrator or manager must directly access individual airconditioners 10, and must enter control commands for system repair/maintenance services in all the airconditioners 10, as shown in FIG. 1.

Particularly, public buildings such as apartments passively administrate or manage their airconditioning systems, such that they unavoidably require a large number of managers or superintendents and high management costs, resulting in cost inefficiency and low use efficiency of the airconditioning system.

In order to solve the aforementioned problems, a central controller for centrally controlling the aforementioned air-conditioning system is connected to the airconditioning system, such that it can control individual operations of a plurality of airconditioners and can also monitor individual states of the airconditioners.

However, the central controller is not directly connected to the airconditioning system, and is indirectly connected to the airconditioning system via a protocol converter and a local controller. In this case, the protocol converter converts a communication standard of a signal communicated between the central controller and the airconditioning system into another communication standard, the local controller controls a prescribed group comprised of the aforementioned airconditioning system, and the protocol converter and the local controller may each be considered to be an intermediate controller.

Therefore, if unexpected network errors occur in the intermediate controller such as either the protocol converter or the local controller, reliability of the signal communicated between the central controller and the airconditioning system is unavoidably deteriorated, such that an erroneous operation control function may be unexpectedly implemented.

In this case, provided that the central controller must be reset or both the central controller and the airconditioning system connected to the communication network must be reset simultaneously, a communication mode between the central controller and the airconditioning system can normally be established.

Furthermore, if the conventional airconditioning system includes a newly-connected or reconnected airconditioner, an administrator or manager must passively assign an ID (Identifier) to the newly-connected or reconnected airconditioner, and must re-enter the assigned ID in the central controller to recognize a network of the airconditioner, resulting in the occurrence of troublesome and inefficient tasks of the administrator or manager.

SUMMARY OF THE INVENTION

Therefore, the present invention has been made in view of the above problems, and it is an object of the invention to provide an airconditioning system for scanning, in real time, connection states of airconditioners contained in a multi-airconditioner and a single-type airconditioner using a protocol converter of a control system capable of integrating the multi-airconditioner with the single-type airconditioner, and transmitting the scanned result to a central controller, such that the central controller can automatically recognize the connection states of the airconditioners on the basis of the scanned result.

It is another object of the invention to provide an airconditioning system which correctly monitors state information of individual airconditioners and at the same time reliably controls operations of the same airconditioners using a central controller, and allows a user not to manually re-enter network state change information associated with a further-connected airconditioner in the central controller, resulting in increased management convenience of the user.

In accordance with one aspect of the present invention, these objects are accomplished by providing a central control system for use in one or more airconditioners, comprising: a plurality of airconditioners for implementing a room airconditioning function; a central controller for monitoring, in real time, connection state information of the plurality of airconditioners, and at the same time controlling operations of the airconditioners; and a protocol converter for converting a communication standard of a signal communicated between the airconditioners and the central controller into another communication standard, and transmitting the scanned connection state information of the airconditioners to the central controller over a communication network.

In accordance with another aspect of the present invention, there is provided a method for operating a central control system for use in one or more airconditioners, comprising the steps of: a) controlling a protocol converter for converting a communication protocol of a signal communicated between a plurality of airconditioners and a central controller for centrally controlling the plurality of airconditioners to communicate with a plurality of airconditioners connected to a communication network according to a first communication standard, and scanning network connection state information; b) acquiring connection state information from the airconditioners according to the scanned result, and updating/storing the connection state information of the acquired connection state information of the airconditioners; c) upon receiving an information request signal from the central controller, transmitting the stored connection state information to the central controller according to a second communication standard; and d) displaying connection state information of the airconditioners using the central controller receiving the connection state information.

In this case, it should be noted that the plurality of airconditioners are applicable to all the airconditioner without limitation to a single-type airconditioner or a multi-airconditioner disclosed for illustrative purposes. For example, the present invention is also applicable to a heat-pump airconditioner capable of performing an indoor heating function.

Individual airconditioners are connected to each other over a predetermined communication network, and are also connected to the protocol converter. In this case, the airconditioners communicate with the protocol converter according to a first communication standard.

The central controller connected to the protocol converter communicates with the protocol converter according to a second communication standard, such that it can monitor, in real time, connection state information of individual airconditioners and can also control operations of the airconditioners.

The protocol converter converts the first communication standard into the second communication standard, such that it can intermediate between the airconditioners and the central controller. Also, the protocol converter scans network connection states of individual airconditioners over the communication network, and updates/stores the acquired connection state information of the airconditioners.

In other words, the protocol converter provides the connection state information upon receiving a request signal from the central controller, such that a manager who accesses the central controller can check connection state information of the airconditioners.

BRIEF DESCRIPTION OF THE DRAWINGS

The above objects, and other features and advantages of the present invention will become more apparent after reading the following detailed description when taken in conjunction with the drawings, in which.

DESCRIPTION OF THE PREFERRED EMBODIMENTS

Figure 1:
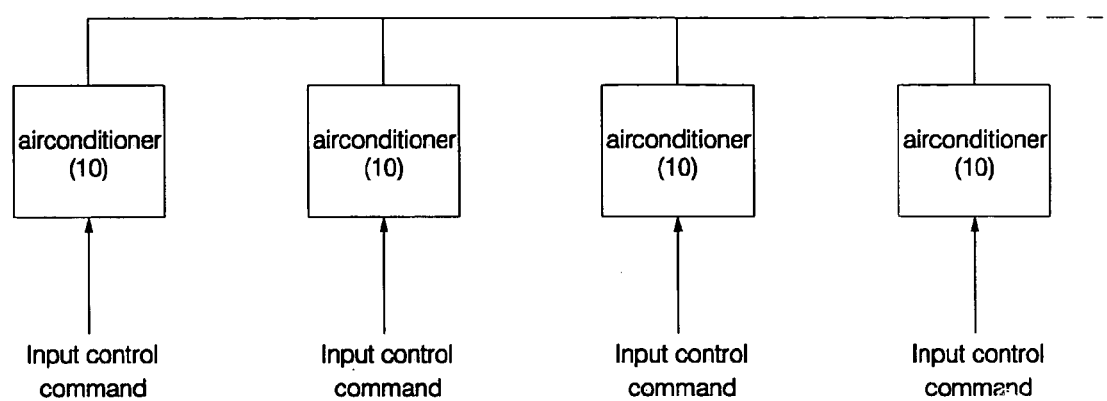
FIG. 1 is a block diagram illustrating a conventional airconditioning system.

Now, preferred embodiments of the present invention will be described in detail with reference to the annexed drawings. In the drawings, the same or similar elements are denoted by the same reference numerals even though they are depicted in different drawings. In the following description, a detailed description of known functions and configurations incorporated herein will be omitted when it may make the subject matter of the present invention rather unclear.

A basic configuration of an airconditioning system of the present invention is similar to that of the aforementioned conventional art, such that its detailed description will herein be omitted for the convenience of description.

Figure 2:
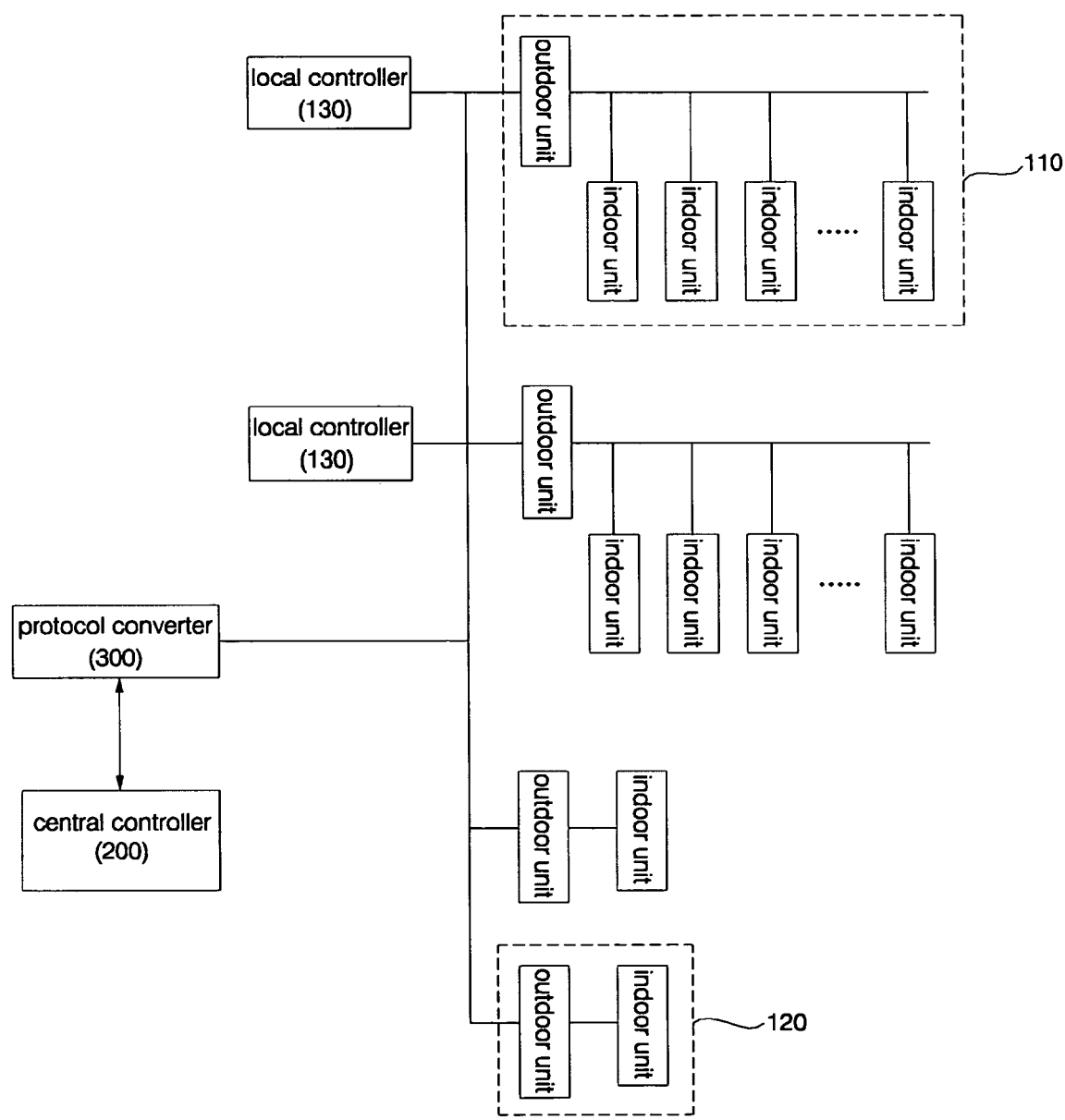
FIG. 2 is a block diagram illustrating a central controller for airconditioners in accordance with a preferred embodiment of the present invention.
Figure 3:
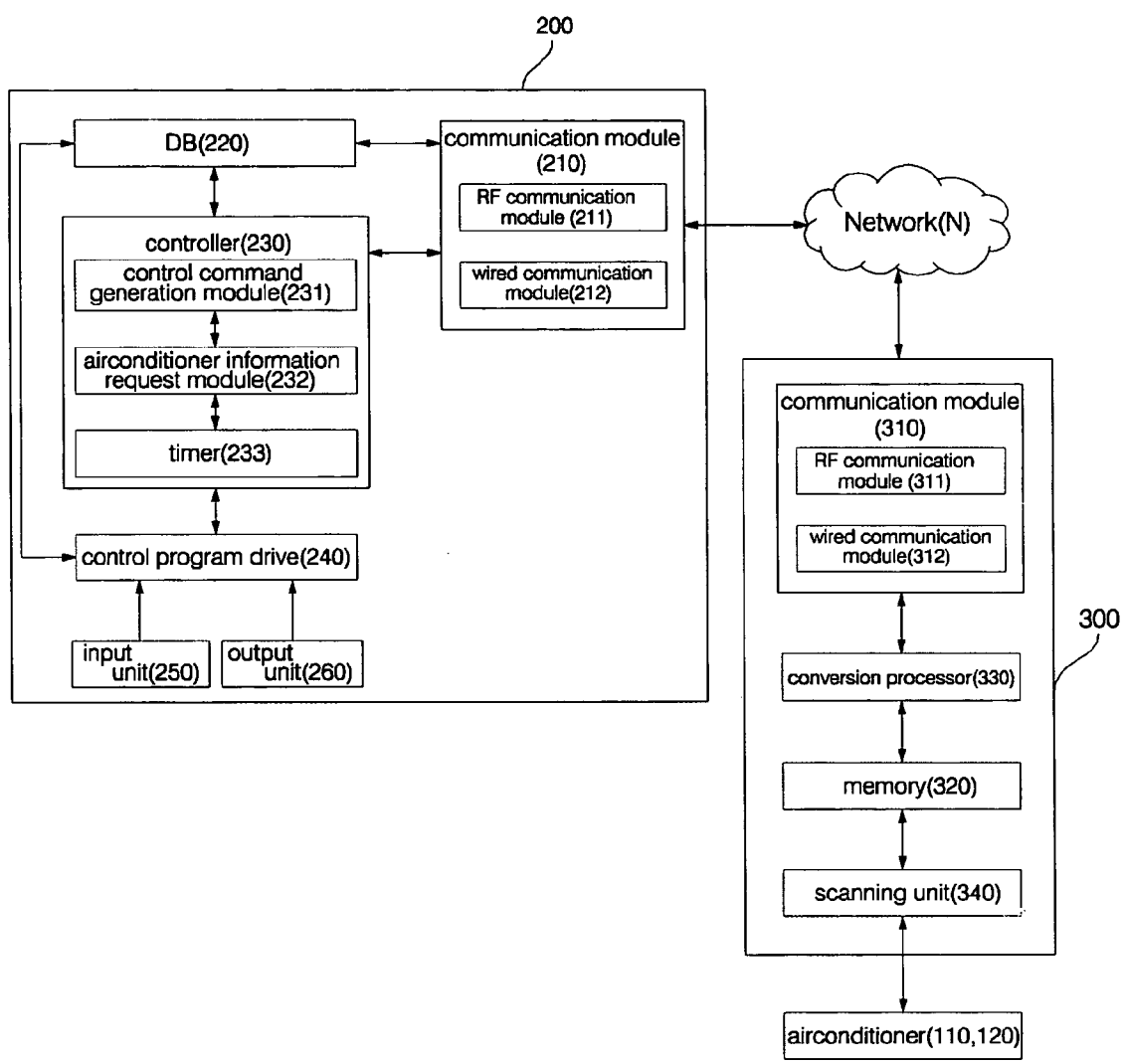
FIG. 3 is a detailed block diagram illustrating the central controller for airconditioners in accordance with a preferred embodiment of the present invention.

FIGS. 2 and 3 are block diagrams illustrating the central controller for use in the airconditioning system according to the present invention.

Referring to FIGS. 2 and 3, the multi-airconditioner 110 is indicative of a 1:N control system in which a single outdoor unit is shared with a plurality of indoor units to control a refrigerant circulating in the indoor units. The single-type airconditioner 120 is indicative of a 1:1 control system in which a single indoor unit is connected to a single outdoor unit on a one to one basis.

The local controller 130 is connected to the outdoor unit to centrally control the multi-airconditioner 110 comprised of the outdoor unit and a plurality of indoor units shared with the outdoor unit.

The central controller 200 is connected to individual outdoor units or individual local controllers 130 over a communication network, such that it can centrally control several multi-airconditioners, a single-type airconditioner, and the local controller 130.

The protocol converter 300 is positioned between the central controller 200 and the airconditioner system, such that a plurality of airconditioner groups having different communication standards, for example, the multi-airconditioner 110, the single-type airconditioner 120, and the central controller 200, are interconnected over the same communication network.

The protocol converter 300 provides an Ethernet communication standard to communicate with the central controller 200, and provides an RS-485 communication standard to communicate with the airconditioning system, such that it includes a conversion processor for converting a communication standard of a communication signal into another communication standard.

The protocol converter 300 includes a scanning unit 340 for calling network addresses assigned to individual indoor units and individual outdoor units to scan a network address of the airconditioning system such that it checks connection state information of the indoor units and the outdoor units; a memory 320 for storing the checked connection state information of the indoor units and the outdoor units; and a communication unit 310 for transmitting connection state information updated/stored in the memory 320 to the central controller 200.

The central controller 200 requests connection state information of the indoor and outdoor units from the protocol converter 300. In this case, the protocol converter 300 transmits the connection state information stored in the memory 320 to the central controller 200.

The central controller 200 includes a communication unit for communicating with the protocol converter 300, a database (DB) 220 for storing airconditioner connection state information received from the protocol converter 300, and a controller 230 for generating/transmitting a control signal to control operations of the airconditioner according to an entry control command.

Particularly, it is preferable that the communication unit 210 is equal to either a wired communication module 212 for signal communication based on an Ethernet communication standard or a wireless communication module 211 for signal communication over an RF (Radio Frequency) network, and it is also preferable that the communication unit 210 includes both the wired communication module 212 and the wireless communication module 211.

In this way, the communication unit 310 of the protocol converter 300 connected to the central controller 200 over the network N can also be implemented with the wired communication module 312 or the wireless communication module 311.

The controller 230 includes a control command generation module 231 for generating/transmitting a control signal to control operations of an airconditioner according to an entry control command, and an airconditioner information request module 232 for requesting state information or network connection state information of a predetermined airconditioner from the protocol converter 300.

The controller 230 further includes a timer 233. The timer 233 counts or times a predetermined request time during which request connection state information of individual airconditioners is periodically requested, and drives the airconditioner information request module 232 if no response signal is received from the protocol converter 300 during the request time.

In this case, a control program interfaced with a user outputs the connection state information received from the protocol converter 300, such that the central controller 200 further includes a control program drive 240 for generating network connection state information of a plurality of airconditioners, and receiving a control command for an operation control function.

The central controller 200 further includes an input unit 250 for receiving a control command to control operations of a plurality of airconditioners connected to the communication network N, and an output unit 260 for outputting state information and connection state information of the airconditioners according to a control signal. In this case, the input unit 250 and the output unit 260 can be integrated in the form of a touch-screen.

If the system of the protocol converter 300 is reset, a connection state associated with the airconditioners 110 and 120 is initialized, such that a scanning operation is performed by the scanning unit 340 and then the connection state information is transmitted to the central controller 200.

If an installation position of an arbitrary indoor unit or outdoor unit is changed to another position on the condition that the protocol converter 300 is powered on, previous position information is deleted by the real-time scanning operation of the scanning unit 310, a network ID is updated with a network ID corresponding to the new installation position, and the updated network ID, and the updated network ID is stored in an internal memory of the protocol converter 300.

The central controller 200 receives connection state information of the real-time scanned airconditioning system from the protocol converter 300, and generates the received connection state information using the control program, such that an administrator or manager can check a current state of the airconditioning system.

Therefore, provided that installation positions of the airconditioners 110 and 120 are changed to other positions or the airconditioners 110 and 120 are further connected to the network such that there arises a variation in network connection state, a user can recognize, in real time, a current network connection state without resetting the central controller 200 and the protocol converter 300 so that a network ID of a changed airconditioner is automatically updated and stored in the memory. As a result, the central controller 200 has an improved state monitoring function and an enhanced operation control function.

Figure 4:
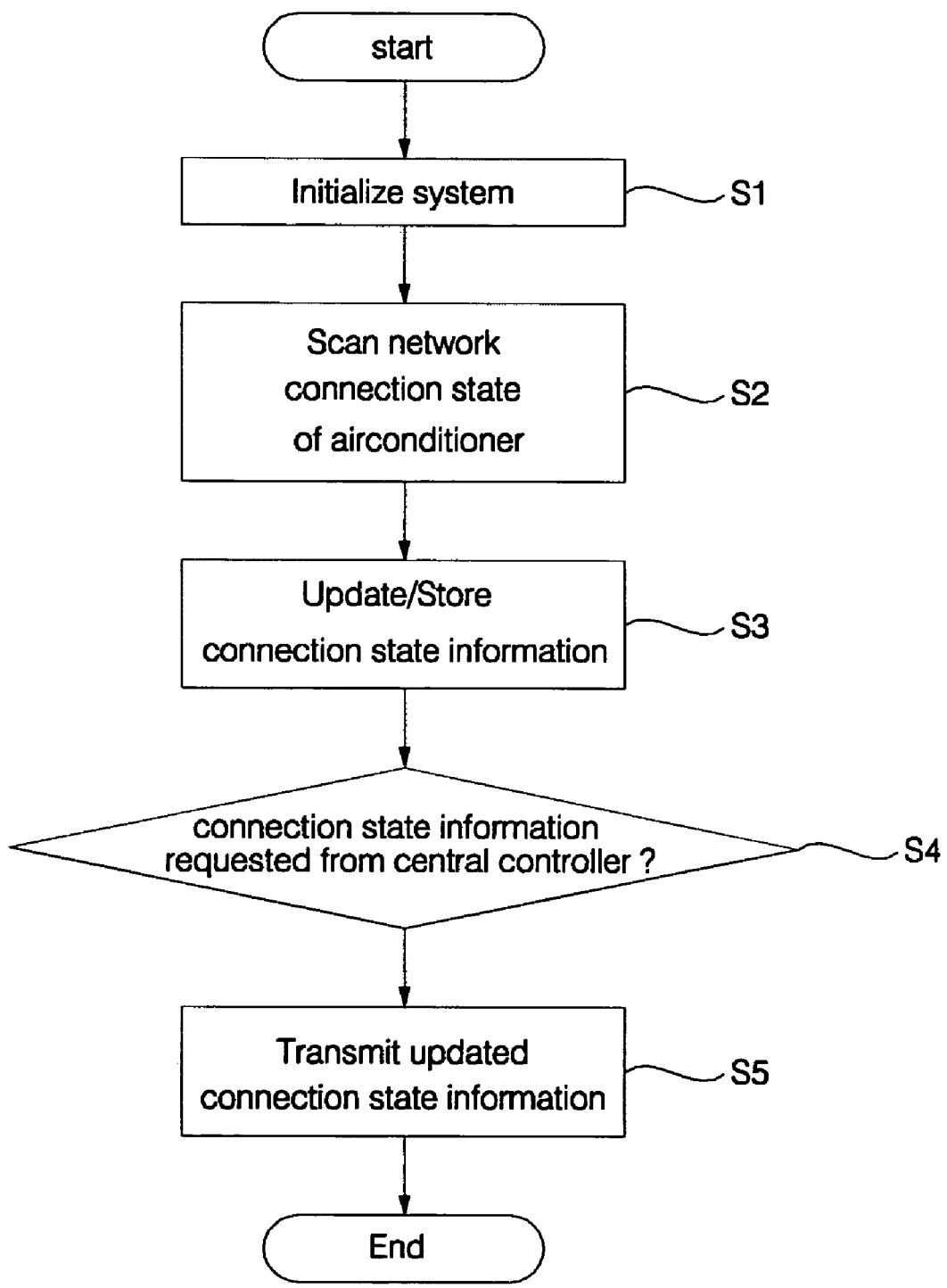
FIG. 4 is a flow chart illustrating a method for operating the central controller of airconditioners in accordance with a preferred embodiment of the present invention.

FIG. 4 is a flow chart illustrating operations of signals communicated between the protocol converter and the outdoor unit in accordance with a preferred embodiment of the present invention.

Referring to FIG. 4, a protocol converter system for converting a communication protocol of a signal communicated between a plurality of airconditioners and a central controller controlling the airconditioners into another communication protocol is initialized at step S1. The protocol converter communicates with the plurality of airconditioners connected to the communication network so as to scan a network connection state at step S2.

In more detail, the protocol converter calls network addresses of individual airconditioners connected to the communication network, and receives information including the network addresses of the airconditioners responding to the call in such a way that the network connection state is scanned. This scanning operation is periodically performed in a predetermined order.

The protocol converter acquires connection state information from individual airconditioners, and stores the acquired connection state information in the memory at step S3.

Thereafter, upon receiving information request information indicative of a network connection state of a predetermined airconditioner or an overall airconditioning system from the central controller at step S4, the protocol converter converts the connection state information stored in the memory into a second protocol, and transmits the converted connection state information to the central controller at step S5.

In this case, the central controller counts or times a request period of time determined to periodically request connection state information of individual airconditioners. Upon receiving no airconditioner information from the protocol converter within the predetermined request period of time, the central controller repeatedly re-transmits the information request signal.

Upon receiving the connection state information from the protocol converter, the central controller stores the received information in a predetermined DB, and displays connection state information of indoor and outdoor units of a corresponding airconditioner according to an administrator's request signal.

As apparent from the above description, a central control system and method for an airconditioning system according to the present invention controls a protocol converter to facilitate signal communication between an airconditioning system having a predetermined protocol and a central controller having another protocol different from the predetermined protocol, such that an integrated control function of the airconditioning system can be implemented irrespective of category information of communication networks.

If a multi-airconditioner and a single-type airconditioner are connected to each other over the same communication network, the protocol converter scans, in real time, connection state information of individual airconditioners, and transmits the scanned connection state information to the central controller, such that the central controller can correctly recognize airconditioners currently connected to the network.

Therefore, an administrator or manager can monitor state information of individual airconditioners using the central controller, and can also reliably control operations of the airconditioners using the same central controller, such that effective airconditioning management can be implemented in a building in which a plurality of airconditioners are installed.

Furthermore, if a current state of the network is changed to another state because a predetermined airconditioner is further connected to the network, the administrator or manager need not passively reset a network ID, etc. in the central controller, resulting in greater convenience of the administrator or manager who manage the airconditioning system and the network.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Patent Application No. 10-2004-0019429, filed on Mar. 22, 2004, the contents of which are herein expressly incorporated by reference in its entirety.

What is claimed is:

1. A central control system for use in one or more airconditioners, comprising:
   a plurality of airconditioners that implement a room airconditioning function;
   a central controller that monitors, in real time, connection state information of the plurality of airconditioners, and at the same time controls operations of the airconditioners;
   a protocol converter including a system, wherein the protocol converter converts a communication standard of a signal communicated between the airconditioners and the central controller into another communication standard, and transmits scanned connection state information of the airconditioners to the central controller over a communication network, such that the central controller automatically recognizes airconditioners currently connected to the communication network; and
   wherein when the system of the protocol converter is initialized, network addresses of each airconditioner currently connected to the communication network are called and stored in a memory of the protocol converter.

2. The central control system according to claim 1, wherein the protocol converter further includes:
   a scanning unit that calls the network addresses of the airconditioners, and scans connection state information of the airconditioners
   wherein the memory that stores the connection state information of the airconditioners scanned by the scanning unit; and
   a communication unit that transmits the information stored in the memory to the central controller.

3. The central control system according to claim 2, wherein the communication unit includes a wired communication module that transmits and/or receives signals based on an Ethernet communication standard.

4. The central control system according to claim 2, wherein the communication unit includes a wireless communication module that transmits and/or receives signals over an RF (Radio Frequency) network.

5. The central control system according to claim 1, wherein the central controller further includes:
   a control program drive that drives a control program which receives the control commands for controlling operations of individual airconditioners, and is implemented with a Graphic User Interface (GUI) to output network connection state information and current state information of the airconditioners.

6. The central control system according to claim 1, wherein the controller includes:
   a control command generation module a control signal to control operations of the airconditioners according to an entry control command; and
   an airconditioner information request module that requests current state information or network connection state information of a predetermined airconditioner from the protocol converter.

7. The central control system according to claim 6, wherein the controller further includes:
   a timer that counts and/or times a request period of time determined to periodically request connection state information from individual airconditioners, and to drive the airconditioner information request module if no response signal is received from the protocol converter during the request period of time.

8. A method for operating a central control system for use in one or more airconditioners, comprising:
   controlling a protocol converter that converts a communication protocol of a signal communicated between a plurality of airconditioners and a central controller that centrally controls the plurality of airconditioners to communicate with a plurality of airconditioners connected to a communication network according to a first communication standard, and scans network connection state information;
   acquiring connection state information from the airconditioners according to the scanned result, and updating/storing the connection state information of the acquired connection state information of the airconditioners;
   upon receiving an information request signal from the central controller, transmitting the stored connection state information to the central controller according to a second communication standard, such that the central controller automatically recognizes airconditioners currently connected to the communication network;
   displaying connection state information of the airconditioners using the central controller receiving the connection state information; and controlling the protocol converter by initializing a system of the protocol converter, calling network addresses of individual airconditioners; and storing the called network addresses.

9. The method according to claim 8, wherein the acquiring connection state information includes periodically scanning network connection state information of all the airconditioners connected to the communication network according to a predetermined order.

10. The method according to claim 8, wherein the acquiring connection state information further includes:
   acquiring airconditioner information containing network address information of an airconditioner having a changed network connection state; and
   transmitting the acquired airconditioner information to the central controller.

11. The method according to claim 8, wherein the displaying connection state information includes:
   counting and/or timing a request period of time determined to periodically request connection state information from individual airconditioners; and
   re-transmitting an information request signal if no response signal is received from the protocol converter during the request period of time.

12. The method according to claim 8, wherein the displaying connection state information includes:
   receiving network connection state information of individual airconditioners from the protocol converter, updating the receiving network connection state information, and
   storing the updated network connection state information in a database (DB).

* * * * *